Aug. 9, 1949.  J. T. KRAPP  2,478,586
COUPLING
Filed Dec. 12, 1946

INVENTOR
JOHN T. KRAPP
BY
Van Deventer + Grier
ATTORNEYS

Patented Aug. 9, 1949

2,478,586

UNITED STATES PATENT OFFICE 2,478,586

COUPLING

John T. Krapp, Port Washington, N. Y.

Application December 12, 1946, Serial No. 715,822

7 Claims. (Cl. 285—173).

This application relates to improvements in coupling devices suitable for coupling conduits and the like, and has for an object the provision of a quickly attachable and quickly detachable coupling, which employs in a socket member, cam means having surfaces adapted to be engaged by an insertable member for clearing a passage for the latter, said cam means having spring means and other surfaces which under the urge of said spring means engage said insertable member and force it endwise therein against a seat in said socket member to effect a fluid-tight seal therewith.

This application is a continuation in part of application Serial No. 684,233, filed on July 17, 1946, and differs from said application in the shapes of the cam means and the provision of spring means to force the insertable member against the seat in said socket member, instead of the hand manipulated levers shown in the earlier application.

A further object of the invention is the provision in a coupling device of a socket member carrying a seat with sealing means thereon, an insertable member having an annular surface adapted to be engaged by cam means in said socket member, said cam means including other surfaces urged by spring means in a direction adapted to force said insertable member endwise against said seat, said cam means being first engaged by the insertable member when the latter is inserted and displaced from the path thereof and having other portions of its surface adapted to engage said annular surface formed in said insertable member to effect said endwise movement and thereby establish a fluid-tight seal between said members capable of withstanding substantial pressures.

Yet another object of the invention is the provision of a coupling of the character described in which the socket member and the insertable member may be manually engaged, said socket member including spring loaded cam means adapted to be displaced by the engageable member to provide a path to said seat and thereafter to engage and force said insertable member against said seat, said cam means each being provided with a lever adapted for manually exerting greater pressure of the insertable member against said seat and the second lever for disengaging the cam from said insertable member to enable an operator to separate and disassociate said members.

Other objects and advantages of the invention will be apparent to those skilled in the art from a study of the following specification and the accompanying drawings, which are given by way of example, to illustrate the invention.

Figure 3:
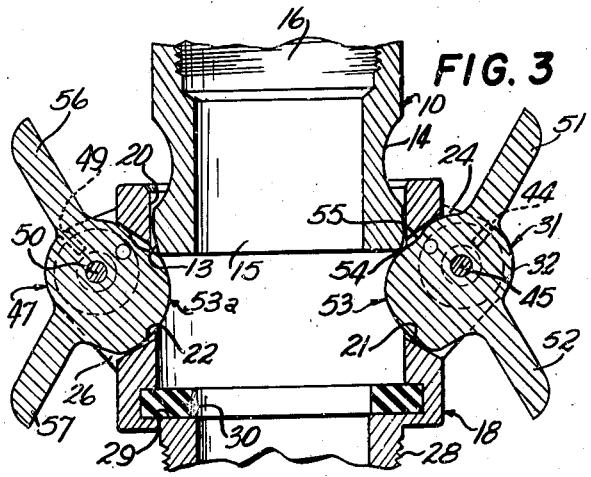
Figure 3 is a sectional elevation showing the insertable member as it first engages the cam means as its end is being inserted in the socket member.
Figure 4:
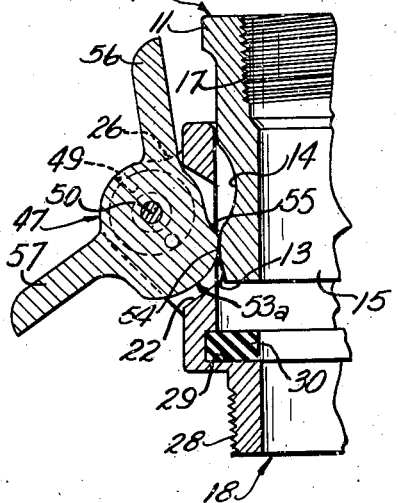
Figure 5:
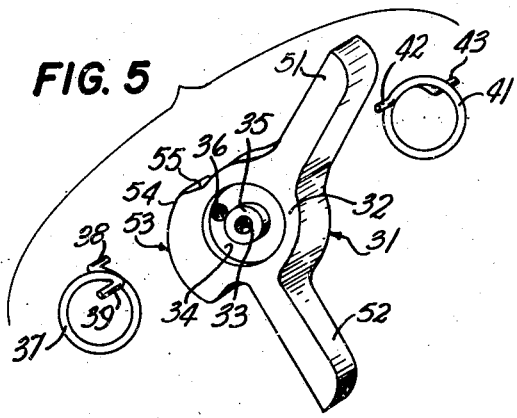

Figure 4 is a fragmentary view, similar to Figure 3, except that the insertable member has displaced the cam to provide a passage for itself into said socket member and the insertable member is shown in such position that the clamping lobe of the spring loaded cam will next engage an annular groove formed on the insertable member and thereafter force the insertable member endwise against the seat in the socket member; and Figure 5 is an exploded view, showing the cam and the springs oppositely disposed on the axis thereof for urging the cam in a direction to force the insertable member against the seat in the socket member.

Figure 1:
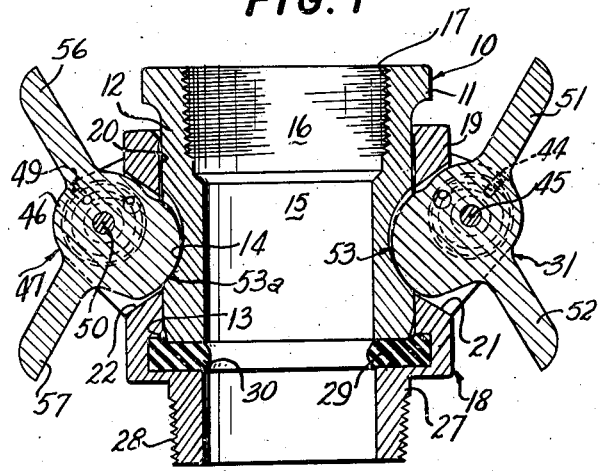
Figure 1 is a sectional elevation of my new and improved coupling, showing the socket member and the insertable member engaged with a fluid-tight seal established between said members.
Figure 2:
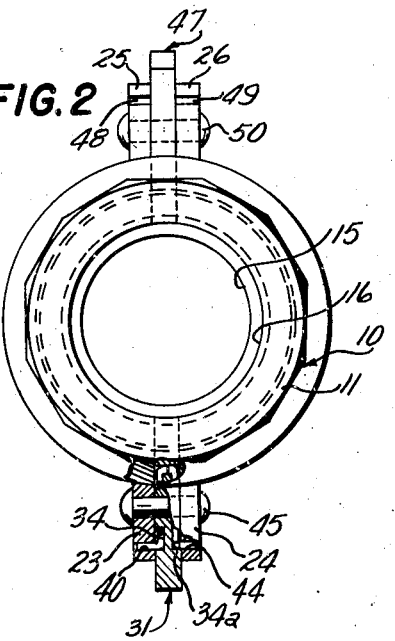
Figure 2 is a plan view of the coupling shown in Figure 1.

Referring first to Figures 1 and 2, an insertable or plug member 10 has a body portion 11 which may have a polygonal exterior and a portion 12 of reduced diameter, which constitutes the plug portion of said member. The plug portion 12 has its lower end rounded or beveled at 13. The purpose of this bevel will be presently described. Spaced upwardly from the lower end thereof, the plug portion has a curved annular groove 14 formed therein and this groove is adapted to be engaged by and cooperate with camming means which will presently be described.

A concentric passage 15 is formed in the member 10 and forms a fluid passage therethrough. The upper end of the member 10 has a counterbore 16 therein which communicates with the passage 15, and this counterbore is provided with threads 17 adapted to be used for connecting the member 10 to a hose or other conduit, either flexible or rigid, leading to a point of use. Since it is obvious that any other means for connecting the member 10 to any device for use may be provided, I am not limited solely to the use of threads for connecting the member 10.

The socket member, generally designated by the numeral 18, has a body portion 19 with a passage 20 formed therein, the diameter of which is slightly larger than the plug portion 12. By making the passage 20 slightly larger than the plug portion 12, the chances of binding when the plug member is inserted therein is eliminated, particularly in view of the fact that the plug portion has a beveled or rounded end 13 formed in the body portion 19. Oppositely disposed in the passage 20 are slots 21 and 22 which communicate with the interior 20 thereof. The edges of the slot 21 are continuous with the inner edges of spaced bosses or lugs 23 and 24. Likewise, the edges of the slot 22 are continuous with the inner edges of spaced bosses 25 and 26.

The body 19 has a portion 27 of reduced diameter and carrying threads 28 for use in connecting the body member to a conduit or the like. Within the body 19 is formed an annular groove 29 adapted to contain a sealing ring 30. The diameter of the annular groove 29 is substantially larger than the diameter of the bore 20. Therefore, an area of the body containing the bore 20 overhangs the groove 29 and thereby prevents the sealing ring 30 from becoming displaced.

The lever 31, which is also shown in perspective in Figure 5, has a boss portion 32 with a bearing hole 33 formed therein. From the left face (the face shown in Figure 5) the boss portion has a counterbore 34 formed therein leaving a small boss 35 concentric with the hole 33. A similar counterbore 34a (see Figure 2) is formed on the opposite face of a boss portion 32 and this counterbore is preferably concentric with the counterbore 34. A hole 36 is formed in the web between the two counterbores and communicates with both of them. A spring 37 has one end 38 bent to parallel the axis of the spring and adapted to engage the hole 36 when the spring 37 is positioned in the counterbore 34. The spring 37 also has its other end 39 bent to parallel the axis of the spring and when the lever 31 is positioned between the bosses 23 and 24, the end 39 of the spring engages a slot 40 formed in the boss 23. A similar spring 41 has an end 42 bent to parallel the axis of the spring and when the spring 41 is in position in the counterbore portion 34a, the end 42 also extends into the hole 36. The end 43 of the spring 41 is also bent to parallel the axis of the spring and when the lever 31 is in position between the bosses 23 and 24, engages a slot 44 formed therein. The combined urges of the two springs tend to rotate the lever 31 about a pin 45 extending through the hole 33 therein and through corresponding aligned holes in the bosses 23 and 24, in a clockwise direction, as seen in Figure 1. A similar arrangement of springs in counterbores formed in the hub 46 of the lever 47 tends to urge the lever 47 in a counter-clockwise direction, as seen in Figure 1. The spring in one side of the counterbored lever engages a slot 48 formed in the boss 25 and a spring in the opposite counterbore has an end which engages a slot 49 in the boss 26. The lever 47 is journaled on pin 50, which extends therethrough and through correspondingly aligned holes formed in the bosses 25 and 26.

The lever 31 has an upper arm 51, and a lower arm 52, which preferably is disposed at an angle greater than ninety degrees with respect to the arm 51. Preferably formed integral with the hub portion 32 of the lever 31 is a cam 53. This cam has a lobe portion 54 which, as may be seen in Figure 3, is first engaged by the beveled portion 13 of the insertable member 10, and the function of this lobe portion is to cam the lever 31 in a counter-clockwise direction and at the same time to cam the lever 47 in a clockwise direction, and thereby to bring a second lobe portion 55 in alignment with the diameter of the lower end of the insertable member, so that it may be entered into the socket member, as shown in Figure 4. When the socket member has reached the position shown in Figure 4, it may be pressed downwardly until its lower end is in contact with the sealing ring 30. As soon as the lower portion of the plug member passes the lobe portions 54 and 55, the annular groove 14 is encountered by the lobe portion 54 and the springs on the lever 31 urge it in a clockwise direction, and thereby force the lower end of the insertable member 15 against the gasket 30, deforming the latter and forming between it and the end of the insertable member a fluid-tight seal. At the same time, the cam on the lever 47, urged in a counter-clockwise direction, also acts against the groove 14 to augment the action of the cam on the lever 31, deforming the sealing ring 30 and effecting said seal.

The lever 47 is provided with an arm 56 like the arm 51 on the lever 31, and an arm 57, like the arm 52. The cammed surface 53 is so shaped that after it engages the groove 14, the more the lever 31 is urged in a clockwise direction by its springs, the more deeply is the end of the insertable member 15 pressed into engagement with the sealing ring 30, and although the act of inserting the insertable member into the socket member 18, in the manner above described, will effect a fluid-tight seal for holding pressures of fluid mediums up to a predetermined high, the arms 52 and 57 may be manually pressed inwardly to effect even tighter seals, capable of holding pressures approaching the safety factor of the device.

In order to disengage the members 10 and 18, the operator presses the arms 51 and 56 toward the device, thereby disengaging the cams 53 and 53a from the annular groove 14, so that the insertable member 10 is freed and may be readily lifted out of the socket member 18.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

What is claimed is:

1. In a separable coupling device, a tubular insertable member having a seating face on one end thereof and an external bevel terminating at said end, a socket member including a tubular portion having an internal shoulder, a gasket on said shoulder adapted to be engaged by said seating face, spring loaded means on said socket member including a cam member extending into said socket member and adapted to be engaged and displaced by said end of said plug member when the latter is inserted, to provide a path therein for said seating face to traverse as it is moved toward said gasket, and means on said plug member adapted to be engaged by said first mentioned means and forced into tensional engagement with said gasket under the urge of the spring load on said first means.

2. In a separable coupling device, a tubular plug member having a seating face on one end thereof and an external bevel terminating at said end, an annular arcuate groove formed on said member in spaced relation to said end, a socket member having a tubular portion with an internal shoulder formed therein, a gasket positioned on said shoulder and adapted to be engaged by said seating face when said plug member is inserted therein, and spring loaded cam means on said socket member extending into said tubular portion and adapted to be engaged by said bevel on the end of said plug member when the latter is inserted and displaced to provide a path therein for said plug member to traverse as its seating face is moved toward said gasket, said cam means being adapted under the urge of its spring load to engage said annular groove and force said seating face into tensional engagement with said gasket.

3. A separable coupling according to claim 2, in which said spring loaded cam means is comprised of at least two cams oppositely disposed in said socket member and individual spring means on each imparting rotative urges thereon in a direction away from said shoulder.

4. In a coupling wherein the end of a plug member is forced into sealing engagement with a gasket positioned on a seat or shoulder within a tubular portion of a cooperative socket member, cam means journaled in the wall of said tubular portion and adapted to be rotatively moved by the end of said plug member to a position providing a path therein for the plug member to be moved into contact with said gasket, spring means engaging said cam means and said wall and normally urging said cam means rotatively in a direction away from said seat, said cam means being normally positioned so that as said pulg is inserted, its end engages said cam and rotates the same to a position providing the path in said socket member as aforesaid for said plug member to traverse as its end is moved toward said gasket, said cam means being subsequently adapted under the urge of its spring load to encounter said annular grove and force said plug toward said gasket with its end in tensional engagement therewith.

5. In a device of the character described, a tubular plug member having a seating face on one end thereof and an annular engageable portion adjacent to said face with the beveled surface therebetween, a tubular socket member having an internal shoulder, a gasket on said shoulder adapted to be engaged by said face, and oppositely disposed cam journaled in the wall of said socket member and extending into the interior thereof, spring means connected to both said cams and tending to urge them in a direction away from said shoulder, said cams having surfaces so arranged that when engaged by the end of said plug members they are cammed to positions providing a path for said plug to traverse and engage said gasket, said cams being adapted to be moved by said spring means to engage said engageable portion and force said plug member endwise, thereby compressing said gasket and effecting a seal between said members.

6. The combination according to claim 5, in which each of said cam members has associated therewith at least one lever, said levers being adapted to be manually moved in a direction to cause said cam to rotatively move toward said shoulder and be disengaged from said engageable portion of said plug member, thereby permitting the latter to be freely removed from said tubular socket member.

7. The combination according to claim 5, in which each of said cam members has associated therewith at least two levers, one pair of said levers being adapted to be manually moved in a direction to cause said cam to rotatively move away from said shoulder for forcing the end of said plug member into greater tensional engagement with said gasket when said device is used to handle abnormal fluid pressures, and the other pair being adapted to be manually moved in a direction to cause said cam to rotatively move toward said shoulder and be disengaged from said engageable portion of the plug member when the latter is to be removed from said tubular socket member.

JOHN T. KRAPP.

REFERENCES CITED

The following references are of record in the file of this patent:

UNITED STATES PATENTS

| Number | Name | Date |
|---|---|---|
| 1,646,873 | Richards | Oct. 25, 1927 |
| 2,033,142 | Lewis | Mar. 10, 1936 |
| 2,187,119 | Fish | Jan. 16, 1940 |